(No Model.)
V. GASTARD
Apparatus for Obtaining Fat from Animal Substances.
No. 231,555. Patented Aug. 24, 1880.
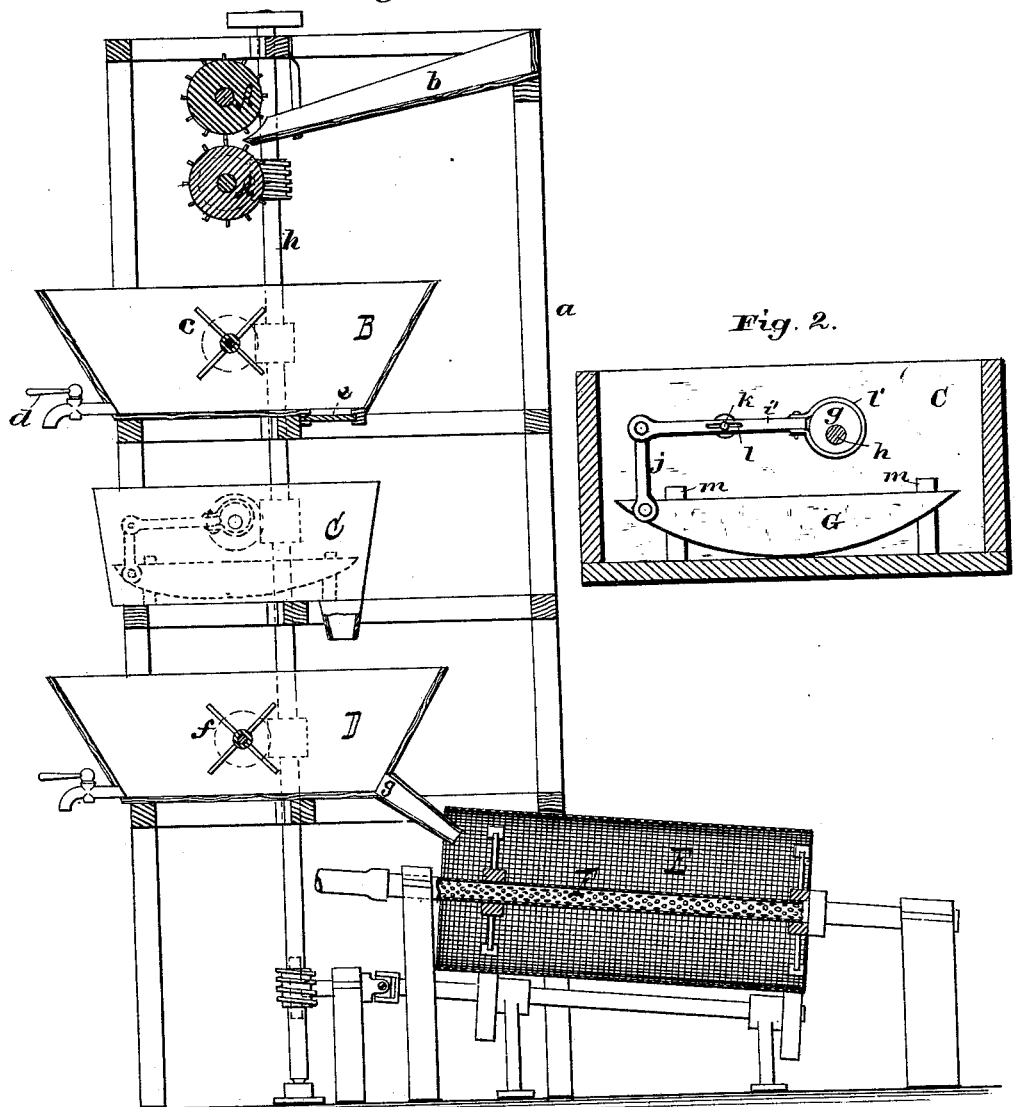
Witnesses
Otto Hupeland
William Miller
Inventor.
Victor Gastard.
by
Van Santvoord & Hauff
his attorneys

UNITED STATES PATENT OFFICE.

VICTOR GASTARD, OF NEW YORK, N. Y., ASSIGNOR TO HIMSELF AND WILLIAM H. McNEILL, OF SAME PLACE.

APPARATUS FOR OBTAINING FAT FROM ANIMAL SUBSTANCES.

SPECIFICATION forming part of Letters Patent No. 231,555, dated August 24, 1880.

Application filed March 4, 1880. (Specimens.)

*To all whom it may concern:*

Be it known that I, VICTOR GASTARD, of the city, county, and State of New York, have invented a new and useful Improvement in Apparatus for Obtaining Fat from Animal Substances, which invention is fully set forth in the following description, and particularly pointed out in the claim, reference being had to the accompanying drawings, in which—

Figure 1 represents a vertical sectional view of an apparatus constructed and arranged in accordance with my invention; and Fig. 2 is a detached sectional view of the chopping-tub, showing one method of operating the chopping-knives.

The novel features of my invention consist in the combination, in an apparatus for obtaining fat from animal substances, of a pair of pressing-rollers for loosening the excrement or other impurities from the skin with a vessel located below the rollers for washing the mass, a chopper for cutting up the cleansed mass, a vessel located below the rollers for washing the mass, a vessel located beneath the chopper for deodorizing the cut-up and cleansed mass, and a perforated rotary cylinder inclosing a perforated pipe.

In the drawings, $a$ designates a frame, which is adapted to support one above the other the several vats in which the intestines are treated, as presently described, the said frame being also constructed in any suitable way to provide bearings for the shafts of the two pressing-rollers A A, which are arranged at the upper part of the said frame.

A chute, $b$, is provided for feeding the intestines to the rollers, which are formed so as to effect the separation of the excrements or other impurities adhering to the skins of the animal intestines which are being drawn between the rollers. These rollers are arranged over a vat, B, into which the skins and excrements or other impurities fall from the rollers. This tub B is utilized for exposing the mass to a washing process, whereby the soluble excrements and other impurities are separated from the skins or insoluble parts, and to this end it is provided with a rotary agitator, $c$, for stirring up the mass, and also with a stop-cock, $d$, for drawing off the water containing the soluble parts.

In the bottom of the tub B is a suitably-arranged valve or slide, $e$, which will be opened after the water has been drawn off, in order to admit of the skins being passed down into a chopping-tub, C. The chopper in this tub may be constructed upon the principle of an ordinary meat-chopper, or in any other suitable manner; but the preferred method is represented in Fig. 2, in which G indicates one of a series of knives having curved cutting-edges, which knives have a rocking motion imparted to them from the worm-wheel shaft by means of an eccentric, $g$, mounted on the shaft $h$, which is rotated by means of the worm-gear, said eccentric being connected by a strap, $l'$, with a lever, $i'$, which is attached to one end of the cutting-knife by a pivoted link, $j$.

The lever $i'$ has its fulcrum on a pivot, $k$, fixed to the side of the chopping-tub and passing through a slot, $l$, in the lever. The cutting-knives are guided in their rocking motion by means of vertical studs $m$.

The chopping-tub is provided with a suitable outlet or slide, in order to admit of the skins being passed down into the deodorizing-vessel D after they have been cut up into small pieces by the chopper. I propose exposing in this vessel the mass obtained as above described to the action of deodorizing agents, such as acetic acid, and to facilitate such action I employ a rotary agitator, $f$, which stirs up the chopped skins and thus exposes the entire mass to the deodorizing agent.

Below the vessel D is an inclined perforated cylinder, E, into which the deodorized mass is fed from a spout, $g$, leading from the vessel D. This cylinder is arranged to be rotated in any suitable manner around a perforated pipe, F, which passes longitudinally through its center and connects with some water-supply pipe. The water admitted into the pipe F is injected through the perforations into the mass contained in the rotating cylinder, whereby the same will be thoroughly washed and cleansed, and, if desired, stationary blades or agitators may be secured to the perforated pipe within the cylinder. After the washing has been completed the operator will subject the mass to the ordinary rendering process, for which purpose any of the ordinary and well-known rendering pans or apparatus may be employed, and which, therefore, I do not consider it necessary to illustrate.

As a convenient way of actuating the rollers, agitators, and chopper, a vertical shaft, $h$, is provided with worm-gears arranged to engage gears upon the respective shafts of said devices, and this vertical shaft may also be employed to drive the rotary perforated washing-cylinder by ordinary mechanical connections, such as shaft and gears.

What I claim is—

The combination, in an apparatus for obtaining fat from animal substances, of a pair of pressing-rollers for loosening the excrement or other impurities from the skins with a tub located below the rollers for washing the mass which comes from the rollers, a chopper for cutting up the cleansed mass, a vessel located beneath the chopper for deodorizing the cut-up and cleansed mass, a perforated revolving cylinder inclosing the perforated pipe F, and operating mechanism, substantially as herein shown and specified.

In testimony whereof I have hereunto set my hand and affixed my seal this 10th day of February, 1880.

V. GASTARD. [L. S.]

Witnesses:
W. HAUFF,
CHAS. WAHLERS.